United States Patent
Satoh

(10) Patent No.: US 9,663,045 B2
(45) Date of Patent: May 30, 2017

(54) WIRING HARNESS AND METHOD FOR MANUFACTURING THE SAME

(71) Applicant: Yazaki Corporation, Tokyo (JP)

(72) Inventor: Harutake Satoh, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/858,268

(22) Filed: Sep. 18, 2015

(65) Prior Publication Data

US 2016/0087414 A1    Mar. 24, 2016

(30) Foreign Application Priority Data

Sep. 19, 2014   (JP) .................................. 2014-191256

(51) Int. Cl.
  *H01B 7/00* (2006.01)
  *H01B 7/20* (2006.01)
  *B60R 16/02* (2006.01)

(52) U.S. Cl.
  CPC ................................ *B60R 16/0207* (2013.01)

(58) Field of Classification Search
  CPC .................................................. B60R 16/0207
  USPC .................................. 174/72 A, 102 C, 113 R
  See application file for complete search history.

(56) References Cited

U.S. PATENT DOCUMENTS

| | | | | | |
|---|---|---|---|---|---|
| 4,866,842 | A | * | 9/1989 | Gorjat | H01B 7/24 174/36 |
| 5,432,300 | A | * | 7/1995 | Fujisawa | H01R 13/6599 174/19 |
| 6,246,001 | B1 | * | 6/2001 | Fukui | H01R 9/034 174/78 |
| 2004/0026101 | A1 | * | 2/2004 | Ochi | H01B 7/0861 174/36 |
| 2011/0067920 | A1 | * | 3/2011 | Toyama | B60R 16/0207 174/72 A |
| 2013/0269971 | A1 | * | 10/2013 | Yukawa | H01B 7/04 174/102 C |
| 2014/0102751 | A1 | | 4/2014 | Iwasaki et al. | |

FOREIGN PATENT DOCUMENTS

| | | |
|---|---|---|
| CN | 103282972 A | 9/2013 |
| CN | 103608989 A | 2/2014 |
| JP | H11353952 A | 12/1999 |
| JP | 2008-305634 A | 12/2008 |

(Continued)

OTHER PUBLICATIONS

Japanese Patent Office Notification of Reasons for Refusal issued in corresponding Patent Application No. JP2014-191256, drafted by Examiner Zaita Wada on Jul. 22, 2016.

(Continued)

*Primary Examiner* — Sherman Ng
(74) *Attorney, Agent, or Firm* — Locke Lord LLP; Howard M. Gitten

(57) ABSTRACT

Provided is a wiring harness and a method of producing the wiring harness which can reduce the man-hour in terminal processing. A shield cable includes a bundle of electric wires formed by bundling a plurality of signal wires and a drain wire together, and a protection tape wound around the bundle of electric wires. Extending portions of the plurality of signal wires and an extending portion of the drain wire have two different lengths from a terminal of the protection tape.

3 Claims, 3 Drawing Sheets

(56) References Cited

FOREIGN PATENT DOCUMENTS

JP        2012113885 A    6/2012
JP        2014-127297 A   7/2014

OTHER PUBLICATIONS

Office Action mailed Sep. 13, 2016, issued for the Chinese patent application No. 201510599666.8 and English translation therefo.
Japanese Patent Office Decision of Refusal issued in corresponding Patent Application No. JP2014-191256, drafted by Examiner Zaita Wada on Nov. 2, 2016.

* cited by examiner

WIRING HARNESS AND METHOD FOR MANUFACTURING THE SAME

CROSS-REFERENCE TO RELATED APPLICATION

This application claims priority to Japanese Patent Application Number 2014-191256 filed on Sep. 19, 2014, the contents of which are fully incorporated herein by reference.

TECHNICAL FIELD

The present invention relates to a wiring harness such as a shield cable wired to a vehicle, and a method for manufacturing the wiring harness.

BACKGROUND ART

Conventionally, a wiring harness, which is wired in a vehicle for connecting various electronic equipments and such, is manufactured such that a plurality of electric wires is bundled together and surrounded by a cover material (i.e., sheath) formed by injection molding.

For example, as shown in FIG. 5, a shield wire 801 disclosed in Japanese Patent Application Publication No. 2008-305634 covers a plurality of core wires 802 and a drain wire for earth, and the core wires 802 and the drain wire 803 are subsequently covered by a shield layer 804 and a sheath 805 made of insulating resin material.

In a terminal processing of such shielding wire 801, the sheath 805 and the shield layer 804 are removed for a predetermined length, and then the cover of a terminal of the exposed core wire 802 is removed, and a terminal 807 is crimped thereto. For the drain wire 803, an insulation electric wire 809 to which the terminal 807 is crimped is additionally attached for the purpose of water stopping.

SUMMARY OF THE INVENTION

Problems to be Solved by the Invention

The above-mentioned shield wire 801 disclosed in Japanese Patent Application Publication No. 2008-305634, however, has a following problem. That is, since the plurality of electric wires bundled together is covered by the sheath 805 formed by injection molding, the sheath 805 and the shield layer 804 are firstly removed in the terminal processing, and then the core wire 802 and the drain wire 803 are cut in the same length. Thus, if only one of these electric wires is to be connected to a mounting location located apart from mounting locations of other electric wires, it is required to additionally attach the insulated electric wire 809 to that electric wire so as to reach to that mounting location, thereby increasing the man-hour in the terminal processing. Furthermore, in case of leading out the shield layer 804 formed of a braid and such instead of the drain wire 803, it is also required to additionally attach the electric wire to the shield layer 804, causing the same problem.

In view of the above-mentioned problems, an object of the present invention is to provide a wiring harness and a method for manufacturing the wiring harness which can reduce the man-hour in the terminal processing.

Solutions to the Problems

According to a first aspect, the present invention provides a wiring harness including, a plurality of electric wires, and a protection member formed into a sheet or a tape and covering a bundle of electric wires formed by bundling the plurality of electric wires together, wherein portions of the respective electric wires extending outside from a terminal of the protection member have multiple different lengths.

According to a second aspect of the present invention, the wiring harness further includes a conductive sheet member provided between the bundle of electric wires and the protection member so as to cover the bundle of electric wires, wherein at least one of the plurality of electric wires is a drain wire which is electrically connected to the conductive sheet member.

According to a third aspect of the present invention, for each of the portions of the plurality of electric wires extending outside from the terminal of the protection member, the length of the portion of the drain wire is different from the length of the portions of the electric wires other than the drain wire.

The present invention provides, according to a forth aspect, a method for manufacturing a wiring harness, the wiring harness having a plurality of electric wires, and a protection member formed into a sheet or a tape and covering a bundle of electric wires formed by bundling the plurality of electric wires together. The method includes a step of producing a bundle of electric wires, in which the plurality of electric wires is bundled together to form the bundle of electric wires such that, when the bundle of electric wires is covered by the protection member, portions of the electric wires extending outside from a terminal of the protection member have multiple different lengths, and a step of covering the bundle of electric wires by the protection member.

Advantages of the Invention

According to the present invention, the portions of the respective electric wires extending outside from the terminal of the protection member have different lengths. Thus, even if the mounting location of an end terminal of one of the plurality of electric wires is located apart from the mounting locations of the respective end terminals of the other electric wires, by designing the length of the portion of the one electric wire extending outside from the terminal of the protection member to be longer than the length of the portions of the other electric wires extending outside from the terminal of the protection member, that is, by suitably designing these extending portions of the plurality of electric wires to have different lengths so as to correspond with the mounting locations of the respective end terminals, the addition of electric wire can be avoided, thus the man-hour in the terminal processing is reduced.

DESCRIPTION OF EXEMPLARY EMBODIMENTS

A shield cable as a wiring harness according to one embodiment of the present invention will now be described with reference to FIGS. 1 through 4. The shield cable according to this embodiment is wired in a vehicle for connecting various electronic equipments to each other, for example.

Figure 1:
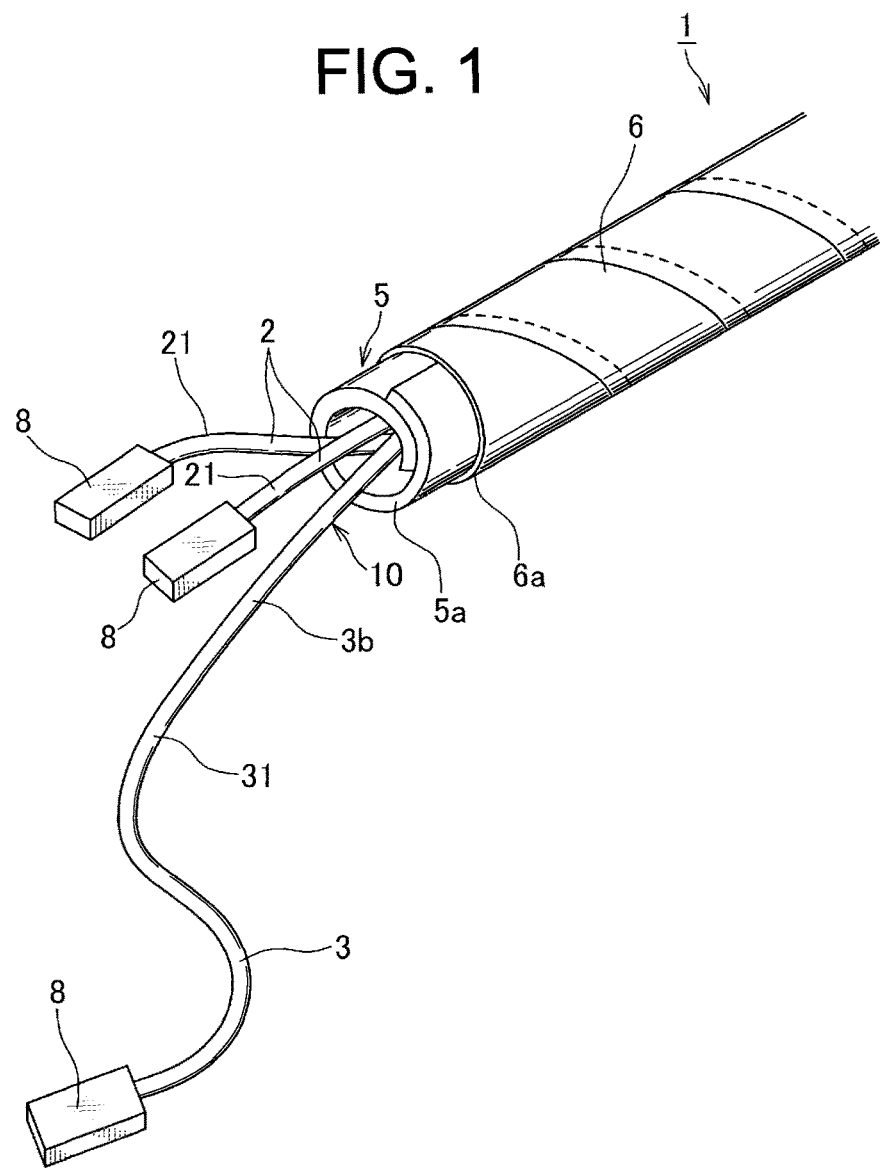
FIG. 1 is a perspective view of one end portion of a shield cable according to one embodiment of the present invention.
Figure 2:
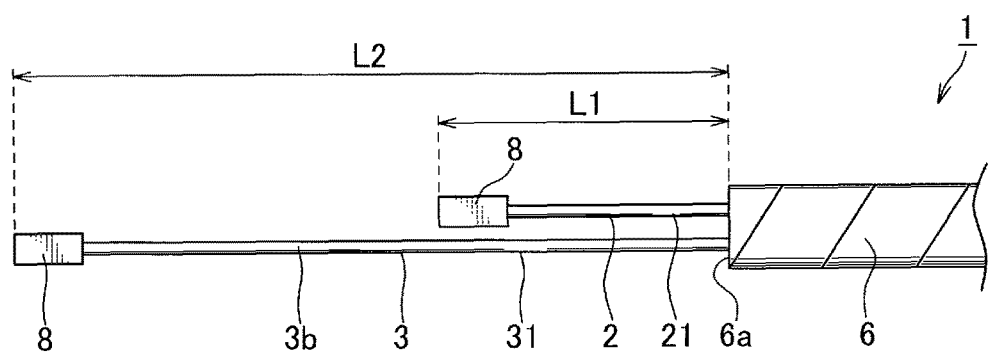
FIG. 2 illustrates lengths of portions of respective electric wires extending outside from a terminal of a protection tape, for the one end portion of the shield cable of FIG. 1.
Figure 3:
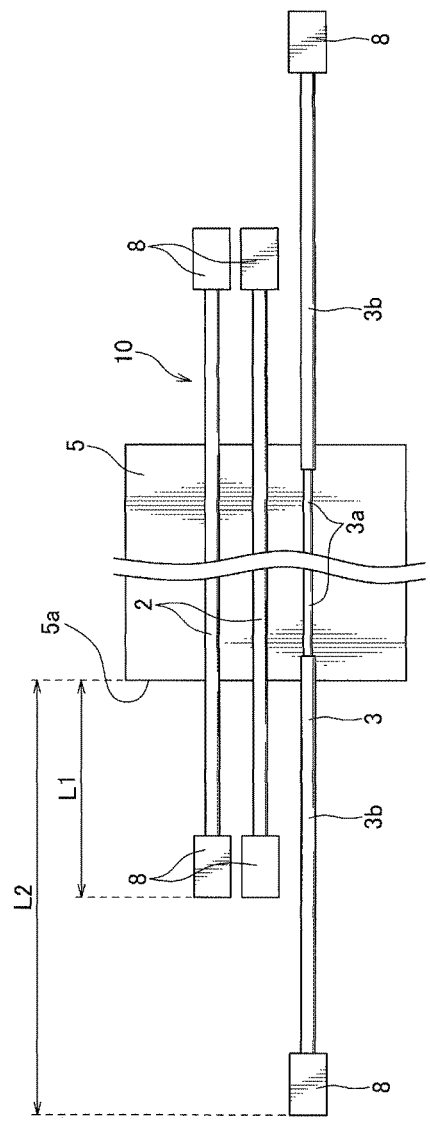
FIG. 3 illustrates a manufacturing method (a step of producing a bundle of electric wires) of the shield cable of FIG. 1.
Figure 4:
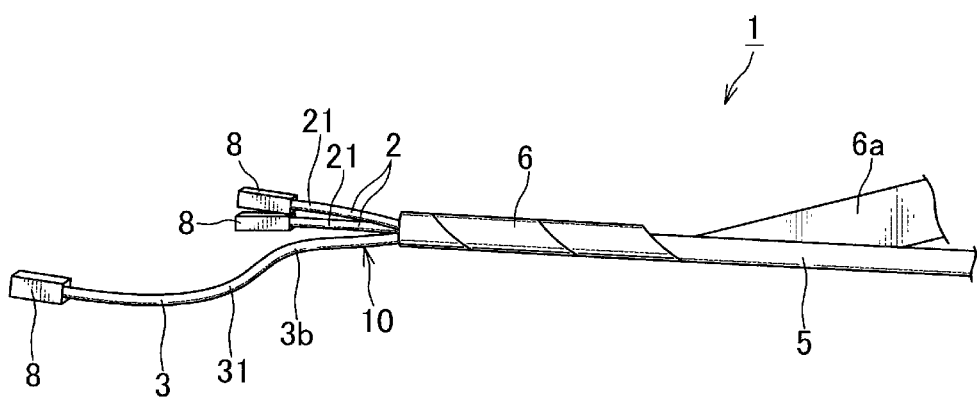
FIG. 4 illustrates a manufacturing method (a step of covering) of the shield cable of FIG. 1.
Figure 5:
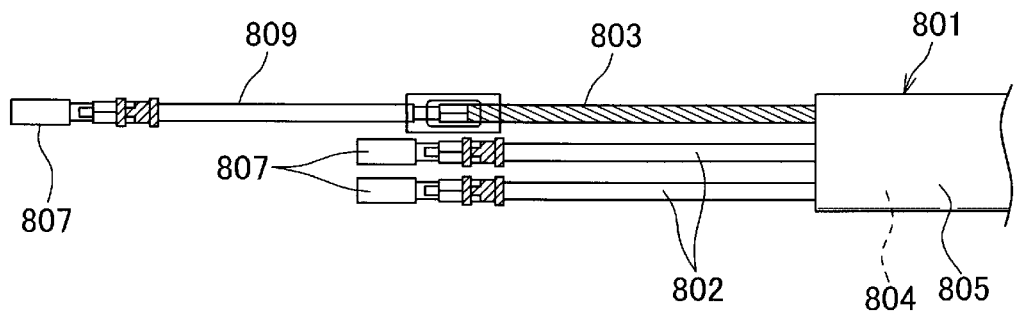
FIG. 5 illustrates a conventional shield wire.

FIG. 1 is a perspective view of one end portion of a shield cable according to one embodiment of the present invention. FIG. 2 illustrates lengths of portions of respective electric wires extending outside from a terminal of a protection tape, for the one end portion of the shield cable of FIG. 1. FIG. 3 and FIG. 4 illustrate a manufacturing method for manufacturing the shield cable of FIG. 1, in which a step of producing a bundle of electric wires and a step of covering are shown, respectively.

As shown in the drawings, a shield cable 1 according to this embodiment includes a plurality of signal wires 2, a drain wire 3, a shield foil 5 as a conductive sheet member, and a protection tape 6 as a protection member. In FIG. 1, for the purpose of illustration, the shield foil 5 is exposed outside from a terminal 6a of the protection tape 6. However, in practice, the terminal 6a of the protection tape 6 and a terminal (i.e. an edge 5a) of the shield foil 5 are arranged at the same position. Alternatively, the terminal of the protection tape 6 is positioned closer to an end portion of the shield cable 1 than the terminal of the shield foil 5.

The plurality of signal wires 2 is a covered electric wire, and includes end terminals 8 provided to both ends of the signal wires 2. The drain wire 3 is an electric wire including insulation cover 3b which covers a core wire 3a only at both end portions of the drain wire 3, as shown in FIG. 3. The core wire 3a is exposed at an intermediate portion of the drain wire 3. The drain wire 3 also includes the end terminals 8 provided to both ends of the drain wire 3. The shield foil 5 is wound around a bundle of electric wires 10 including the respective signal wires 2 and the drain wire 3 bundled together, such that the shield foil 5 is in contact with the core wire 3a of the drain wire 3 at the intermediate portion and electrically connected to this drain wire 3. The protection tape 6 is an insulating tape that is flexible and long. One face of the protection tape 6 consists of an adhesive face 6b on which an adhesive material is applied (FIG. 4), and is spirally wound around a circumference of the shield foil 5. The lengths along the lengthwise direction of the shield cable 1 (i.e., the entire lengths) of the shield foil 5 and of the protection tape 6 are the same. Alternatively, the entire length of the protection tape 6 may be longer than the entire length of the shield foil 5, such that the protection tape 6 covers the entire portion of the shield foil 5 including the terminal of the shield foil 5. The protection tape 6 is not required to be a single member, that is, more than one members such as a tape and a sheet may be combined together to provide the equivalent function.

As shown in FIG. 2, at one end of the shield cable 1, a length L1 of portions of the respective signal wires 2 extending outside from the terminal 6a of the protection tape 6 (hereinafter, "extending portions 21") is arranged shorter than a length L2 of a portion of the drain wire 3 extending outside from the terminal 6a of the protection tape 6 (hereinafter, "extending portion 31"). In other words, the extending portion 21 and the extending portion 31 of each of plurality of signal wires 2 and the drain wire 3 have two different lengths, the length L1 and the length L2. For the drain wire 3, the portion with the insulation cover 3b which is extending outside corresponds to the extending portion 31. Thus, the extending portion 31 and the extending portion 21 of each of the drain wire 3 and the plurality of signal wires 2, which are extending outside from the terminal 6a of the protection tape 6, have the different lengths L2 and L1.

Next, a method for manufacturing the shield cable 1 is explained below with reference to FIG. 3 and FIG. 4.

Firstly, the plurality of signal wires 2 and the drain wire 3 are manufactured so as to have the lengths corresponding to their wiring conditions. Then, the plurality of signal wires 2 and the drain wire 3 are disposed in parallel to each other on the unfolded shield foil 5 to form the bundle of electric wires 10 (a step of producing a bundle of electric wires). Here, the portion of the signal wire 2 extending outside from the edge 5a of the shield foil 5 (i.e., the portion corresponding to the extending portion 21) has the length L1, and the portion of the drain wire 3 extending outside from the edge 5a of the shield foil 5 (i.e., the portion corresponding to the extending portion 31) has the length L2. As described later in a step of covering, the protection tape 6 is wound around the shield foil 5 such that the protection tape 6 and the shield foil 5 have the same length along the lengthwise direction of the shield cable 1. In other words, the respective signal wires 2 and the drain wire 3 are bundled together such that the positions of the end terminals 8 of the signal wires 2 and the drain wire 3 are displaced in the lengthwise direction, such that, when the shield foil 5 is covered by the protection tape 6, the portions extending outside from the terminal of the protection tape 6 have two different lengths, L1 and L2.

Next, the shield foil 5 is rounded so as to enwrap the intermediate portion of the bundle of electric wires 10, such that the end portions of the respective signal wires 2 extend outside from the terminal of the shield foil 5 for the length L1, and such that the end portion of the drain wire 3 extends outside from the terminal of the shield foil 5 for the length L2. Then, the protection tape 6 is wound in a spiral fashion throughout from one end to the other end of the shield foil 5, such that adjacent wound portions of the protection tape 6 are partially overlapped (a step of covering). In this manner, the shield cable 1 is manufactured.

According to this embodiment, the extending portions 21 of the plurality of signal wires 2 and the extending portion 31 of the drain wire 3 have two different lengths, the length L1 and the length L2. Thus, even if the mounting location of the end terminal 8 of the drain wire 3 is located apart from the mounting locations of the respective end terminals of the signal wires 2, since the length L2 of the extending portion 31 of the drain wire 3 is longer than the length L1 of the extending portions 21 of the respective signal wires 2, that is, the length L1 of the extending portions 21 of the respective signal wires 2 and the length L2 of the extending portion 31 of the drain wire 3 are designed to be different in a suitable manner so as to correspond with the mounting locations of the respective end terminals 8, thus the addition of electric wires is not required, thereby reducing the man-hour in the terminal processing of the shield cable 1.

The present invention has been described above with an exemplary embodiment. However, the wiring harness and the method for manufacturing the wiring harness of the present invention are not limited to the above-described embodiment.

For example, in the above-described embodiment, the protection member includes the protection tape 6 in form of a tape; however, the protection member is not limited to this, and the protection member may include an insulating sheet having a rectangular shape, and the insulating sheet may be wound around the circumference of the shield foil 5.

Furthermore, in the above-described embodiment, the length of the extending portions 21 of the plurality of signal wires 2 and the length of the extending portion 31 of the drain wire 3 are different; however, the present invention is not limited to this. For example, the length of the extending portion 21 of one signal wire 2 of the plurality of signal wires 2 may be different from the length of the extending portions 21 of the other signal wires 2 and the extending portion 31 of the drain wire 3. Alternatively, the extending portions 21 of the plurality of signal wires 2 and the extending portion 31 of the drain wire 3 may have plurality of different lengths, such as three or more different lengths.

Furthermore, in the above-described embodiment, the shield foil 5 and the drain wire 3 are provided; however, the present invention is not limited to this. The shield foil 5 and the drain wire 3 may be eliminated, and only the plurality of signal wires 2 and the protection tape 6 may be provided.

Furthermore, in the above-described embodiment, when higher waterproof property is required, a waterproof member such as vinyl chloride paste may be provided between the shield foil 5 and the protection tape 6, for example.

It should be noted that the aforementioned embodiments are only exemplary embodiments of the present invention, and the present invention is not limited to these embodiments. That is, a person skilled in the art may make various changes and modifications to the above-described embodiments based on the well-known knowledge without departing from the gist of the present invention. Those changes and modifications are still encompassed by the present invention, as long as they include the configuration of the wiring harness and the method for manufacturing the wiring harness of the present invention.

REFERENCE SIGNS 1 shield cable
2 signal wire (electric wire)
3 drain wire
5 shield foil (conductive sheet member)
6 protection tape (protection member)
6a terminal of protection tape
10 bundle of electric wires
21 extending portion (a portion of an electric wire extending outside from a terminal of a protection tape)
31 extending portion (a portion of an electric wire extending outside from a terminal of a protection tape)

What is claimed is:
1. A wiring harness comprising:
a plurality of electric wires having end terminals connected thereto,
a protection member formed into a sheet or a tape and covering a bundle of electric wires formed by bundling the plurality of electric wires together, and
a conductive sheet member provided between the bundle of electric wires and the protection member so as to cover the bundle of electric wires;
wherein portions of the respective electric wires having the end terminals connected thereto extending outside from a terminal of the protection member have multiple different lengths;
wherein at least one of the plurality of electric wires having the end terminals connected thereto is a drain wire which is electrically connected to the conductive sheet member;
wherein the drain wire includes a first insulation cover extending along a first end of the drain wire, and a second insulation cover extending along a second end of the drain wire, such that a portion of the drain wire extending outside from the terminal of the protection member is insulated; and
wherein the drain wire is in contact with the conductive sheet at a position between the first end and the second end of the drain wire.

2. The wiring harness according to claim 1, wherein, for each of the portions of the plurality of electric wires having the end terminals connected thereto extending outside from the terminal of the protection member, the length of the portion of the drain wire is different from the length of the portions of the electric wires other than the drain wire.

3. A method for manufacturing a wiring harness, the wiring harness having a plurality of electric wires having end terminals connected thereto, and a protection member formed into a sheet or a tape and covering a bundle of electric wires formed by bundling the plurality of electric wires together, the method comprising the steps of,
producing a bundle of electric wires, in which the plurality of electric wires having the end terminals connected thereto is bundled together to form the bundle of electric wires such that, when the bundle of electric wires is covered by the protection member, portions of the electric wires extending outside from a terminal of the protection member have multiple different lengths, covering the bundle of electric wires by the protection member;
providing a drain wire electrically connected to a conductive sheet member, the drain wire including a first insulation cover extending a long a first end of the drain wire, and a second insulation cover extending along a second end of the drain wire;
extending a portion of the drain wire outside from the terminal of the protection member; and
positioning the drain wire in contact with the conductive sheet at a position between the first and the second end of the drain wire.

* * * * *